(12) United States Patent
Niewels et al.

(10) Patent No.: US 8,583,324 B2
(45) Date of Patent: Nov. 12, 2013

(54) METHOD AND DEVICE FOR DETERMINING THE ANGLE OF INCLINATION OF A TWO-WHEELED VEHICLE

(75) Inventors: Frank Niewels, Ludwigsburg (DE); Markus Lemejda, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 127 days.

(21) Appl. No.: 12/998,650

(22) PCT Filed: Sep. 25, 2009

(86) PCT No.: PCT/EP2009/062418
§ 371 (c)(1),
(2), (4) Date: Jul. 21, 2011

(87) PCT Pub. No.: WO2010/054887
PCT Pub. Date: May 20, 2010

(65) Prior Publication Data
US 2011/0288693 A1    Nov. 24, 2011

(30) Foreign Application Priority Data
Nov. 17, 2008 (DE) .......................... 10 2008 043 794

(51) Int. Cl.
*B60G 17/016*        (2006.01)
(52) U.S. Cl.
USPC ............................... 701/38; 701/41; 702/154

(58) Field of Classification Search
USPC ........ 701/38, 41, 70; 180/6.2; 280/5.5, 5.502; 702/141, 151, 154
See application file for complete search history.

(56) References Cited

U.S. PATENT DOCUMENTS

| 4,989,922 A |   | 2/1991 | Pickenhan et al. |
| 6,654,671 B2 | * | 11/2003 | Schubert ............................ 701/1 |
| 8,155,798 B2 | * | 4/2012 | Seiniger et al. .................. 701/1 |
| 8,321,088 B2 | * | 11/2012 | Brown et al. .................... 701/38 |
| 2007/0106442 A1 | * | 5/2007 | Lu .................................... 701/38 |
| 2009/0222164 A1 | * | 9/2009 | Seiniger et al. ................. 701/36 |

FOREIGN PATENT DOCUMENTS

| DE | 100 39 978 | 5/2001 |
| DE | 10 2006 061 483 | 8/2007 |
| EP | 0 370 469 | 5/1990 |
| EP | 0 943 517 | 9/1999 |
| JP | 2-216355 | 8/1990 |
| JP | 2004-155404 | 6/2004 |
| WO | WO 02/01151 | 1/2002 |

* cited by examiner

*Primary Examiner* — Helal A Algahaim
(74) *Attorney, Agent, or Firm* — Kenyon & Kenyon LLP

(57) ABSTRACT

In a method for determining the angle of inclination of a two-wheeled vehicle of the type of a bicycle, a scooter or a motorcycle with respect to the roadway normal, the angle of inclination is able to be determined simply and accurately if the transverse acceleration of the vehicle is measured using a transverse acceleration sensor and the acceleration in the direction of the vertical axis of the vehicle is ascertained and the angle of inclination with respect to the roadway normal is calculated based on the two acceleration values.

11 Claims, 1 Drawing Sheet

Fig. 1
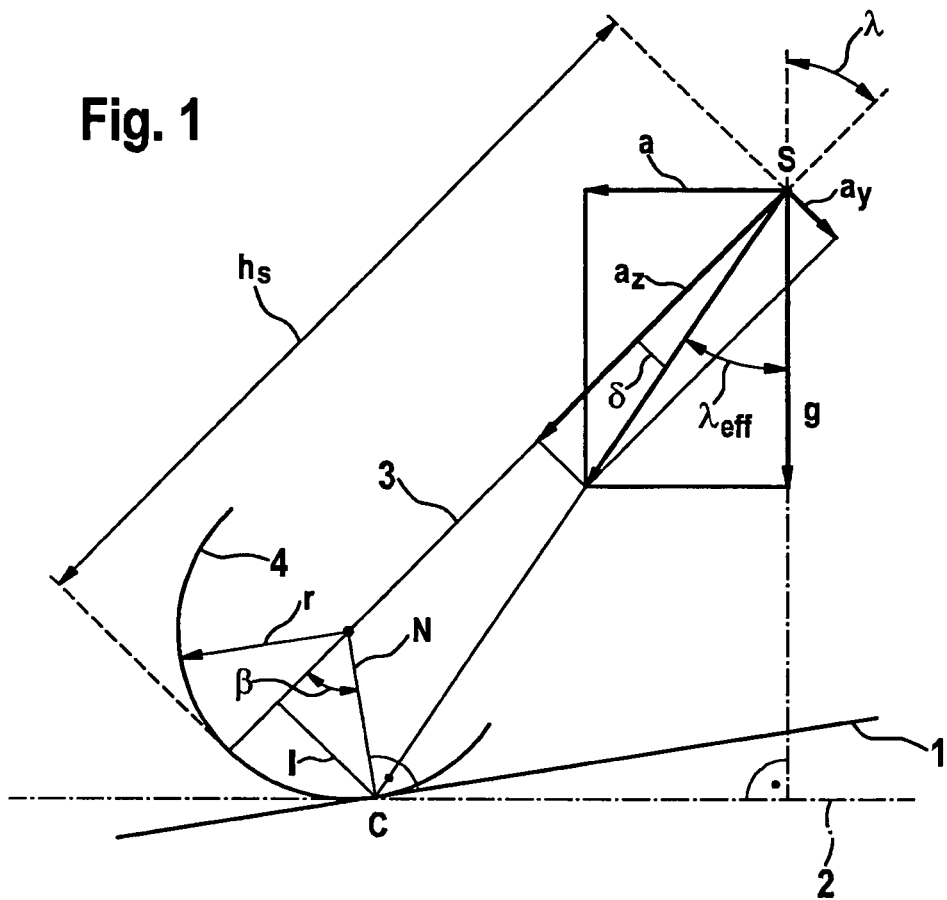
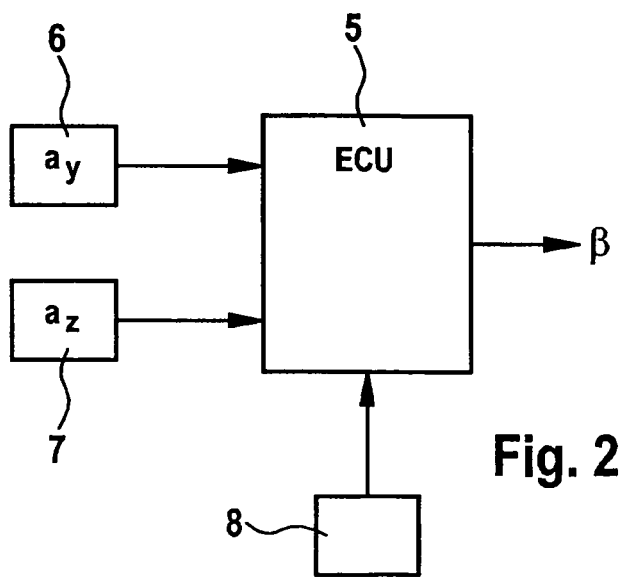
Fig. 2

METHOD AND DEVICE FOR DETERMINING THE ANGLE OF INCLINATION OF A TWO-WHEELED VEHICLE

BACKGROUND OF THE INVENTION

1. Field of the Invention

The present invention relates to a method and device for determining the angle of inclination of a two-wheeled vehicle.

2. Description of Related Art

During cornering using a two-wheeled vehicle of the type of a bicycle, a scooter or a motorcycle, the center of tire contact wanders from the middle of the tire casing in the direction towards the side. The distance of the center of tire contact from the tire center plane is an important variable, especially during braking and accelerating in the curve, since this distance, in connection with the braking force or accelerating force acting in the vehicle's longitudinal direction, gives rise to a torque about the z axis (vertical axis), which is transmitted to the steering.

Different methods are known from published European patent document EP 370469 or published European patent document EP 0943517 for determining the angle of inclination of a two-wheeled vehicle with respect to the roadway. However, these methods are more likely not practicable for mass production application.

BRIEF SUMMARY OF THE INVENTION

It is therefore an object of the present invention to create a method and a device, which make it possible to determine the angle of inclination of a two-wheeled vehicle with respect to the roadway, in a simple manner and cost-effectively.

One essential aspect of the present invention is to calculate the angle of inclination from the transverse acceleration and the acceleration in the direction of the vertical axis (z axis) of the vehicle. The designation "angle of inclination" should be understood to mean the angle between the vehicle's vertical axis and the roadway, as well as, in addition, each angle from which such an angle is able to be calculated, such as the angle of the vehicle's vertical axis with respect to the roadway normal. The transverse acceleration $a_y$ is preferably measured directly using a transverse acceleration sensor. The acceleration in the direction of the vertical axis may either also be measured using an acceleration sensor or calculated from the sensor signals of one or more other sensors, such as a yaw rate sensor or a speed sensor. The angle of inclination of a two-wheeled vehicle with respect to the roadway may thus be determined in a very simple manner.

According to one preferred specific embodiment of the present invention, angle of inclination $\beta$ is calculated from the two acceleration values $a_y$, $a_z$ and a geometrical relationship that describes the course of the tire geometry in the transverse direction. One may approximately assume a circular segment for the tire geometry, for example. In this case, one could describe the tire geometry by a radius r.

One device according to the present invention for determining angle of inclination $\beta$ of a two-wheeled vehicle includes at least one transverse acceleration sensor and a device for determining acceleration $a_z$ in the direction of the vertical axis of the vehicle, as well as a device such as a control unit, for calculating the angle of inclination on the basis of acceleration values $a_y$, $a_z$ and perhaps additional variables.

BRIEF DESCRIPTION OF THE DRAWINGS

FIG. 1 shows a representation of various geometrical variables and accelerations which occur during the cornering of a two-wheeled vehicle.

FIG. 2 shows a schematic block diagram of a device for determining the angle of inclination of a two-wheeled vehicle with respect to the normal of the roadway.

DETAILED DESCRIPTION OF THE INVENTION

FIG. 1 shows various geometrical variables and accelerations which occur during cornering of a two-wheeled vehicle. Reference numeral 4, in this context, designates the tire casing, C the center of tire contact on roadway surface 1, and 2 a virtual horizon. The angle of inclination of the vehicle with respect to roadway normal N is denoted by $\beta$. The course of the tire cross section profile is assumed, in this case, in a simplified manner as a circular segment having a radius r. The distance of center of tire contact C from the tire center plane or vehicle center plane 3 is designated as I.

The vehicle has a center of gravity S having a center of gravity height $h_s$ in the direction of the vertical axis (the z axis) of the vehicle. During cornering, accelerations $a_y$ acts in the transverse direction (y direction) and $a_z$ acts in the direction of vertical axis z. The gravitational acceleration is denoted by g. Arrow a gives the acceleration in the direction of virtual horizon 2.

Angle of inclination $\lambda$ with respect to a plumb line is composed of the effective angle of inclination $\lambda_{eff}$ between plumb line g and a straight line that runs through center of tire contact C and center of gravity S, and an angle $\delta$ between this straight line and vehicle center plane 3. Consequently, we have $$\lambda = \lambda_{eff} + \delta$$

The angle of inclination $\beta$ of the vehicle with respect to the roadway normal, that is sought, may now be estimated as follows:

$$\beta = \arcsin\left(\frac{I}{r}\right)$$

In this case this was based on a circular profile cross section having a radius r. For other tire cross section geometries, the connection between I and $\beta$ may be adapted appropriately.

Distance I may be calculated as follows, in this context: For additional angle of inclination $\delta$, the following first applies:

$$\tan\delta = \frac{a_y}{a_z}$$

According to FIG. 1 the connection between $\delta$ and lateral offset I of center of tire contact C is:

$$\tan\delta = \frac{I}{h_s - r + \sqrt{r^2 - I^2}}$$

If I remains small compared to $h_s$, one may approximate as follows:

$$l \approx h_s \tan\delta = h_s \frac{a_y}{a_z}$$

In summary, angle of inclination β of the vehicle with respect to the roadway normal may be estimated as follows from accelerations $a_y$ and $a_z$:

$$\beta = \arcsin(h_s/r * a_y/a_z)$$

The value of transverse acceleration $a_y$ is measured directly using a transverse acceleration sensor 6 (see FIG. 2). The value $a_z$ for the acceleration in the direction of vertical axis z of the vehicle may also be directly measured or may optionally also be calculated, for instance, according to the method of DE 10235378 A1, from the signal of a yaw rate sensor and the vehicle's longitudinal speed. In this instance, an angle of inclination λ is first calculated from the sensor signals, and then acceleration $a_z$ is calculated from angle of inclination λ:

$$a_z = \sqrt{g^2 + a^2} = g \cdot \sqrt{1 + \tan^2 \lambda_{eff}} \approx g \sqrt{1 + \tan^2 \lambda}$$

This applies for small angles δ, that is, where $\lambda_{eff} \approx \lambda$.

This method for the calculation of angles of inclination applies only for stationary states, however, in which the angle of inclination does not change or changes only very slightly. In order to detect such a stationary state, for instance, one or more rotation rate sensors and acceleration sensors positioned in different spatial directions may be used. Such an additional sensor system may also be used to compensate for the influences of a changing angle of inclination β on acceleration signals $a_y$ and $a_z$.

FIG. 2 shows a device for determining the angle of inclination of a two-wheeled vehicle with respect to roadway normal N. In the present exemplary embodiment, acceleration values $a_y$ and $a_z$ are measured using appropriate acceleration sensors 6, 7. The individual sensor signals are fed to a control unit 5, which, based on the sensor signals, calculates angle of inclination β with respect to roadway normal N according to the above equation. In addition, one or more additional sensors 8 may be used for detecting and taking into account interference variables, and thereby for increasing accuracy. Thus, for example, weight sensors, spring excursion sensors or optical sensors may be used to ascertain additional data on the position or the motion of the two-wheeled vehicle.

What is claimed is:

1. A computer-implemented method for determining an angle of inclination of a two-wheeled vehicle, comprising:
   ascertaining a transverse acceleration and an acceleration in the direction of the vertical axis of the vehicle;
   ascertaining a value of a first geometric variable that describes a cross-sectional profile of a tire of the vehicle along the transverse direction;
   calculating, using a processor of a computer, a second geometric variable as a function of the transverse acceleration and the acceleration in the direction of the vertical axis;
   calculating, using the processor, the angle of inclination as a function of a geometric relationship between the first geometric variable and the second geometric variable.

2. The method as recited in claim 1, wherein the acceleration in the direction of vertical axis is one of (i) directly measured using an acceleration sensor for the direction of the vertical axis of the vehicle or (ii) calculated from a signal of at least one acceleration sensor.

3. The method as recited in claim 1, wherein the second geometric variable corresponds to the distance of the center of tire contact from a tire center plane.

4. The method as recited in claim 1, wherein the acceleration in the direction of the vertical axis is calculated from signals of a yaw rate sensor and a speed sensor.

5. The method as recited in claim 3, wherein the angle of inclination (β) is calculated from the relationship:

$$\beta = \arcsin\left(\frac{l}{r}\right),$$

I being the second geometric variable, and r being the first geometric variable, which is a profile radius of the tire.

6. The method as recited in claim 3, wherein the distance I of the center of tire contact from the tire center plane is calculated from the relationship:

$$l = h_s \frac{a_y}{a_z}$$

where $h_s$ is the height of the center of gravity of the vehicle, $a_y$ is the transverse acceleration value, and $a_z$ is the value of the acceleration in the direction of the vertical axis of the vehicle.

7. The method as recited in claim 5, wherein the angle of inclination β is an angle of inclination of the vehicle with respect to the roadway normal.

8. A device for determining an angle of inclination of a vehicle, comprising:
   a device for determining a transverse acceleration of the vehicle;
   a device for determining an acceleration of the vehicle in the direction of the vertical axis of the vehicle; and
   a processing device configured to calculate the angle of inclination by:
      calculating a second geometric variable as a function of the transverse acceleration and the acceleration in the direction of the vertical axis; and
      calculating the angle of inclination as a function of a geometric relationship between a first geometric variable that describes a cross-sectional profile of a tire of the vehicle along the transverse direction and the second geometric variable.

9. The device as recited in claim 8, wherein the device for determining the acceleration in the direction of the vertical axis is an acceleration sensor.

10. The device as recited in claim 9, wherein the device for determining the acceleration in the direction of the vertical axis includes at least one of a yaw rate sensor and a further sensor, and wherein the acceleration in the direction of the vertical axis is calculated based on at least one signal from the at least one of the yaw rate sensor and the further sensor.

11. The device as recited in claim 9, wherein the processing device is configured to, when calculating the angle of inclination, compensate for changes in the transverse acceleration and the acceleration in the direction of the vertical axis, which changes are caused by motion of the vehicle, by taking into account at least one additional sensor signal that provides information about the motion of the vehicle.

\* \* \* \* \*

UNITED STATES PATENT AND TRADEMARK OFFICE
CERTIFICATE OF CORRECTION

PATENT NO. : 8,583,324 B2  Page 1 of 1
APPLICATION NO. : 12/998650
DATED : November 12, 2013
INVENTOR(S) : Niewels et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 194 days.

Signed and Sealed this
Twenty-second Day of September, 2015

Michelle K. Lee
*Director of the United States Patent and Trademark Office*